(12) United States Patent
Buchanan et al.

(10) Patent No.: US 10,125,828 B2
(45) Date of Patent: Nov. 13, 2018

(54) HYDRAULIC POWER PACK ACTUATOR FOR CONTROLLING A MANUAL CLUTCH

(71) Applicant: BorgWarner Inc., Auburn Hills, MI (US)

(72) Inventors: Mark Ray Buchanan, Rochester Hills, MI (US); Joel M. Maguire, Northville, MI (US)

(73) Assignee: BorgWarner Inc., Auburn Hills, MI (US)

( * ) Notice: Subject to any disclaimer, the term of this patent is extended or adjusted under 35 U.S.C. 154(b) by 37 days.

(21) Appl. No.: 15/116,856

(22) PCT Filed: Feb. 10, 2015

(86) PCT No.: PCT/US2015/015195
§ 371 (c)(1),
(2) Date: Aug. 5, 2016

(87) PCT Pub. No.: WO2015/123196
PCT Pub. Date: Aug. 20, 2015

(65) Prior Publication Data
US 2016/0348743 A1 Dec. 1, 2016

Related U.S. Application Data

(60) Provisional application No. 61/939,890, filed on Feb. 14, 2014.

(51) Int. Cl.
*B60W 10/02* (2006.01)
*F16D 48/06* (2006.01)
(Continued)

(52) U.S. Cl.
CPC .......... *F16D 48/066* (2013.01); *B60K 23/02* (2013.01); *F16D 25/14* (2013.01); *F16D 28/00* (2013.01);
(Continued)

(58) Field of Classification Search
CPC ...................................................... B60W 10/02
See application file for complete search history.

(56) References Cited

U.S. PATENT DOCUMENTS 3,684,071 A * 8/1972 Wheymann ............. F16H 63/46
192/105 F
4,621,721 A * 11/1986 Czerwick ................ F16D 25/14
192/109 F
(Continued)

FOREIGN PATENT DOCUMENTS

CN 103038531 A 4/2013
DE 4442090 A1 5/1996
(Continued)

OTHER PUBLICATIONS

International Search Report and Written Opinion; dated May 13, 2015; for International Application No. PCT/US2015/015195; 12 pages.
(Continued)

*Primary Examiner* — Tisha D Lewis
(74) *Attorney, Agent, or Firm* — BrooksGroup

(57) ABSTRACT

A number of variations may include a clutch system having a clutch; a first cylinder operatively connected to the clutch; a passive valve operatively connected to the first cylinder; a hydraulic power pack actuator and a second cylinder operatively connected to the passive valve; an electronic control unit operatively connected to the hydraulic power pack actuator; and a clutch pedal operatively connected to the second cylinder.

18 Claims, 2 Drawing Sheets

(51) Int. Cl.
  *B60K 23/02* (2006.01)
  *F16D 48/02* (2006.01)
  *F16D 28/00* (2006.01)
(52) U.S. Cl.
  CPC ............ *F16D 2048/0263* (2013.01); *F16D 2500/1026* (2013.01); *F16D 2500/3024* (2013.01); *F16D 2500/3056* (2013.01); *F16D 2500/31413* (2013.01); *F16D 2500/501* (2013.01); *F16D 2500/508* (2013.01); *F16D 2500/5085* (2013.01); *F16D 2500/50858* (2013.01); *F16D 2500/50883* (2013.01)

(56) References Cited

U.S. PATENT DOCUMENTS

| | | | | |
|---|---|---|---|---|
| 4,766,988 | A * | 8/1988 | Seibert | F16D 48/066 |
| | | | | 180/197 |
| 4,825,989 | A * | 5/1989 | Frigger | B60T 8/17616 |
| | | | | 180/197 |
| 5,135,091 | A * | 8/1992 | Albers | F16D 48/04 |
| | | | | 192/83 |
| 6,033,341 | A | 3/2000 | Yamamoto et al. | |
| 6,170,624 | B1 | 1/2001 | Arai et al. | |
| 7,571,795 | B2 * | 8/2009 | Bader | F16D 25/088 |
| | | | | 192/85.51 |
| 9,151,347 | B1 * | 10/2015 | Shaw | F16D 48/066 |
| 2008/0060900 | A1 | 3/2008 | Pick | |
| 2010/0298094 | A1 | 11/2010 | Oda et al. | |
| 2013/0131943 | A1 * | 5/2013 | Iwao | F16D 48/066 |
| | | | | 701/67 |

FOREIGN PATENT DOCUMENTS

| | | | | |
|---|---|---|---|---|
| EP | 1342930 | A2 | 9/2003 | |
| JP | 2010223317 | A | 10/2010 | |
| KR | 1020050038997 | A | 4/2005 | |
| TW | 200824937 | A | 6/2008 | |
| WO | WO-2012014650 | A1 * | 2/2012 | ........... F16D 48/066 |

OTHER PUBLICATIONS

Chinese Office Action dated Mar. 26, 2018; Application No. 201580007529.9; Applicant: BorgWarner Inc.; 20 pages.

* cited by examiner

HYDRAULIC POWER PACK ACTUATOR FOR CONTROLLING A MANUAL CLUTCH

CROSS-REFERENCE TO RELATED APPLICATIONS

This application claims the benefit of U.S. Provisional Application No. 61/939,890 filed Feb. 14, 2014.

TECHNICAL FIELD

The field to which the disclosure generally relates to includes clutches.

BACKGROUND

A manual transmission vehicle may include one or more clutch systems.

SUMMARY OF ILLUSTRATIVE VARIATIONS

One variation may include a product comprising: a clutch system comprising: a clutch; a first cylinder operatively connected to the clutch; a passive valve operatively connected to the first cylinder; a hydraulic power pack actuator and a second cylinder operatively connected to the passive valve; an electronic control unit operatively connected to the hydraulic power pack actuator; and a clutch pedal operatively connected to the second cylinder.

Another variation may include a method comprising: automatically controlling a manual clutch comprising: operatively connecting a hydraulic power pack actuator to a passive valve which is operatively connected to a clutch; operatively connecting an electronic control unit to the hydraulic power pack actuator; and controlling the hydraulic power pack actuator with the electronic control unit to automatically modulate a pressure to the passive valve to cause the clutch to go into at least one of an ON, OFF, or slipping mode based on at least one vehicle condition.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
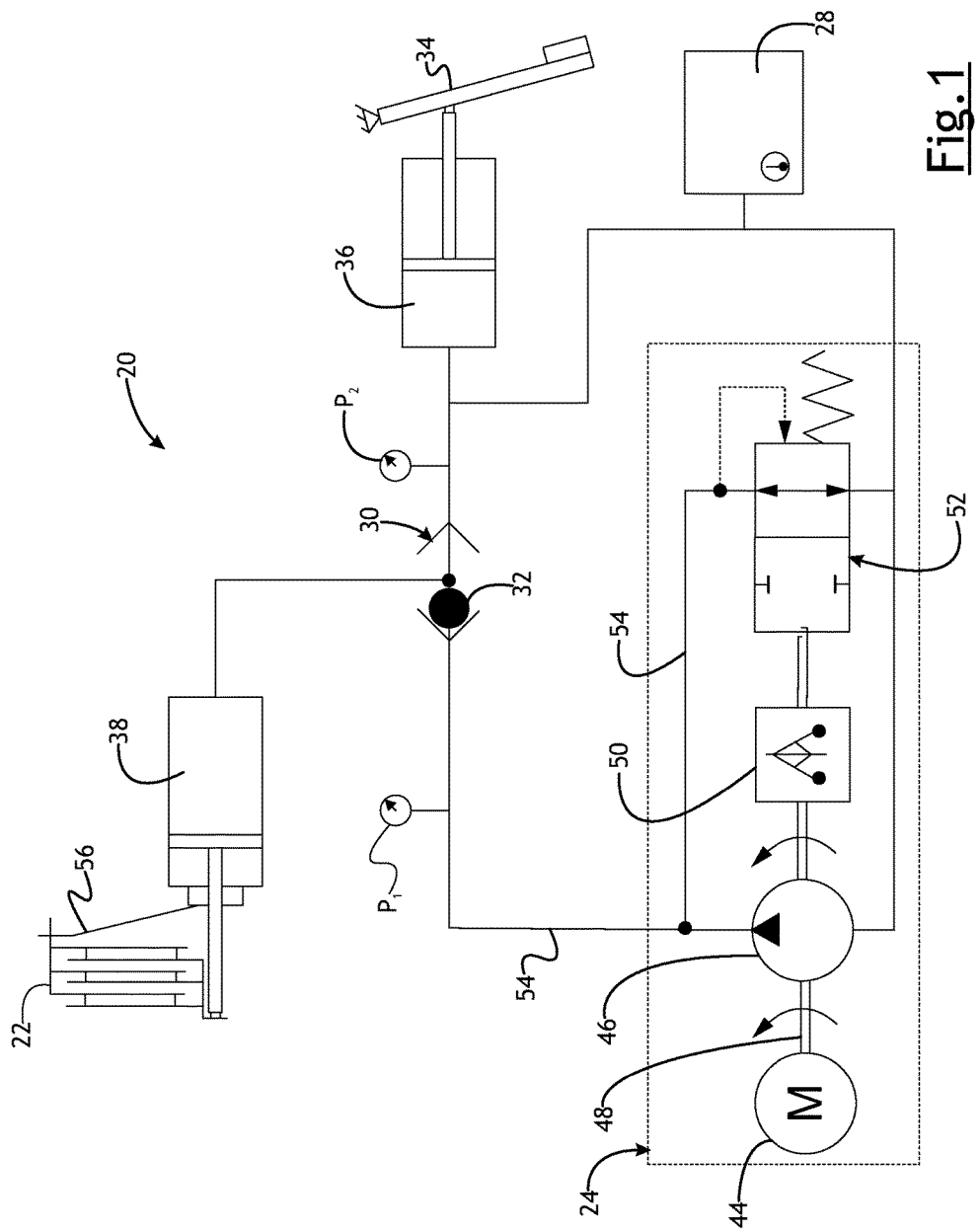
FIG. 1 illustrates a clutch system according to a number of variations.

Referring to FIG. 1, in a number of variations, a manual transmission vehicle may include one or more clutch systems 20. A manual transmission clutch system 20 may be used to transmit or prevent the flow of power from the engine to the transmission. A clutch may comprise a single plate clutch or a multi-plate clutch 22, for example as illustrated in FIG. 1. A clutch 22 may be in an "ON", "OFF", or "slipping" mode. When the clutch 22 is in an ON mode, the engine and the transmission may be engaged which may allow the vehicle to be driven. When the clutch 22 is in an OFF mode, the clutch 22 may cause a disconnect in power between the engine and the transmission. This may allow the engine to run while the vehicle is not in a driving mode and may allow a driver to shift gears. When the clutch 22 is in a slipping mode, the clutch 22 may be in a condition which is neither in a fully ON or OFF mode and may transmit partial power between the engine and transmission.

In a number of variations, a clutch system 20 may comprise a clutch 22 which may be operatively connected to a slave cylinder 38. In any number of variations, the slave cylinder 38 may be activated by pressure which may then control the clutch 22. Any number of variations of passive valves including, but not limited to, a spool valve, a three-way check valve, or a three-way ball check valve 30, as illustrated in FIG. 1, may be operatively connected to the slave cylinder 38 and may control the source of oil which may enter into the slave cylinder 38 either from the master cylinder 36 or a hydraulic power pack 24. In any number of variations, a master cylinder 36 may be operatively connected to the three-way ball check valve 30. A clutch pedal 34 may be operatively connected to the master cylinder 36. In a number of variations, an operator may activate the clutch pedal 34 by manually stepping and/or pressing down on the clutch pedal 34 which may cause pressure to increase from the master cylinder 36 to the three-way ball check valve 30. In one variation, the pressure generated from the clutch pedal 34 may cause a ball 32 in the three-way ball check valve 30 to change positions which may allow oil from the master cylinder 36 into the slave cylinder 38 which may cause the clutch 22 to go into OFF mode. In a number of variations, a reservoir 28 may also be operatively connected to the master cylinder 36.

Figure 2:
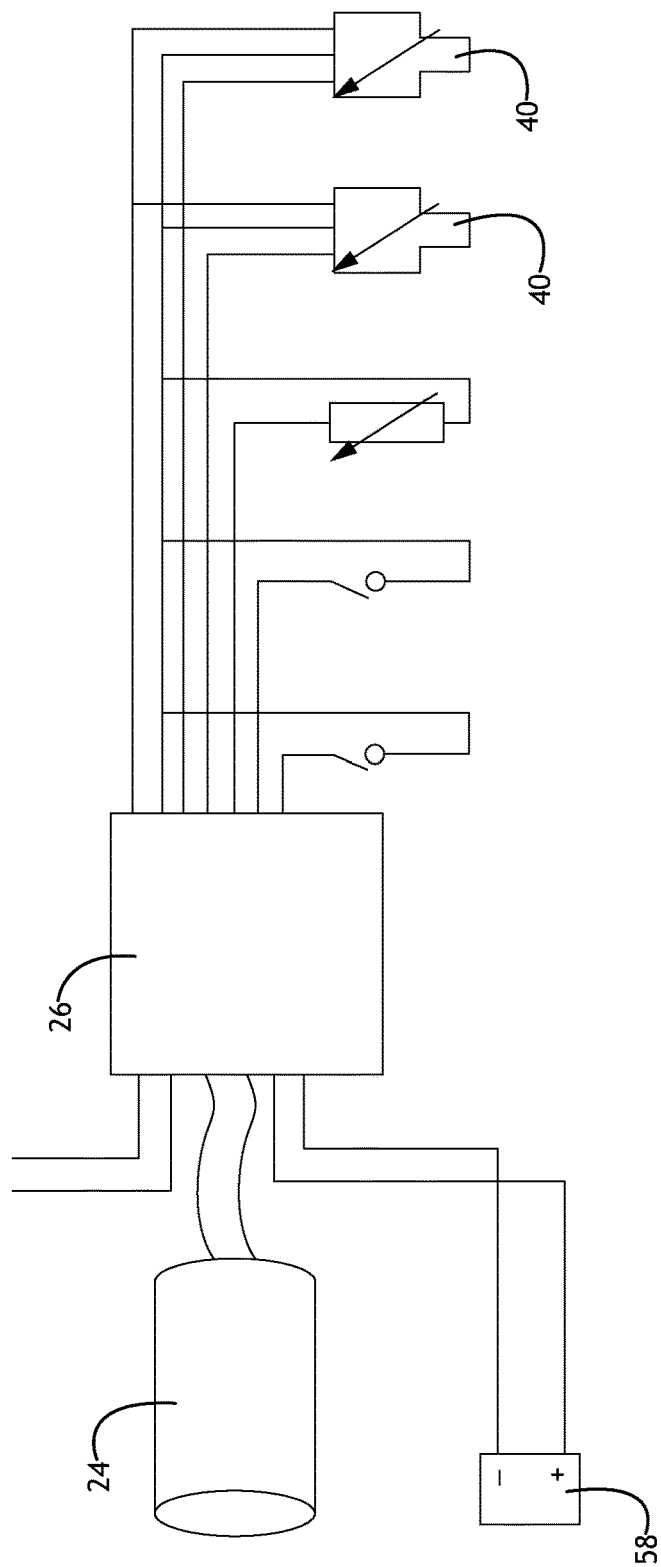
FIG. 2 illustrates an electronic control unit system according to a number of variations.

Referring to FIGS. 1 and 2, in a number of variations, a hydraulic power pack actuator 24 may also be operatively connected to the three-way ball check valve 30. An electronic control unit 26 may be operatively connected to the hydraulic power pack actuator 24, for example as illustrated in FIG. 2.

In a number of variations, the clutch 22 may be in an ON mode by reducing the pressure to a slave cylinder 38 attached to the clutch 22. This may be done manually, by releasing the clutch pedal 34, or automatically by releasing pressure from the hydraulic power pack actuator 24 as will be discussed below. In a number of variations, the clutch 22 may be in an OFF mode by increasing the pressure to a slave cylinder 38 attached to the clutch 22. This may be done manually by stepping on the clutch pedal 34, or automatically by increasing the pressure from the hydraulic power pack actuator 24 as will be discussed below.

In any number of variations, a hydraulic power pack actuator 24 may comprise an electric motor 44, a pump 46, a pressure regulator 50, and if desired any number of pressure storage devices 28 including, but not limited to, an accumulator. Any number of hydraulic power pack actuators 24 may be used including, but not limited to, a centrifugal electro-hydraulic actuator 24. In a number of variations, a centrifugal electro-hydraulic actuator 24 may comprise an electric motor 44 which may drive an actuator pump 46 via a drive shaft 48, which may also drive a centrifugal regulator 50. The position of the centrifugal regulator 50 may control the position of and the flow through one or more pressure overflow valves 52. Hydraulic oil used in the centrifugal electro-hydraulic actuator 24 system may be contained in a reservoir 28. The oil may be drawn into the actuator pump 46 through a hydraulic line 54 and may be delivered therefrom toward the three-way ball check valve 30 through a hydraulic line 54. Depending on the position of the centrifugal regulator 50 and thus the pressure overflow valve(s) 52, at least a portion of the hydraulic flow may be diverted through a hydraulic line 54, through the pressure overflow valve 52, and back into the reservoir 28. This may result in the pressure delivered to the three-way ball check valve 30 being governed by the centrifugal regulator 50. In a number of variations, the centrifugal electro-hydraulic actuator 24 may provide a linear relationship between pressure and motor current.

In a number of variations, the pressure $P_1$ from the centrifugal electro-hydraulic actuator 24 may be high and the pressure $P_2$ from the master cylinder 36 may be low or zero. In order to increase the pressure $P_1$ from the centrifugal electro-hydraulic actuator 24, the motor current may be increased which may increase the speed of the motor. This may cause the overflow valve(s) 52 to close which may increase the pressure $P_1$. The pressure $P_1$ may then cause a ball 32 in the three-way ball check valve 30 to remain in a position blocking oil from reaching the slave cylinder 38 from the master cylinder 36. The oil from the centrifugal electro-hydraulic actuator 24 may then pass through the three-way ball check valve 30 which may activate the slave cylinder 38 which may compress the spring 56 in the clutch 22 which may then set the clutch 22 in OFF mode. In order to reduce the pressure $P_1$ from the centrifugal electro-hydraulic actuator 24, the motor current may be reduced which may decrease the speed of the motor 44. This may cause the centrifugal overflow valve(s) 52 to open and pressure may bleed off which may cause the excess oil to go into the reservoir 28. Even though pressure may be decreasing in the centrifugal electro-hydraulic actuator 24, the pressure may still be higher than the master cylinder 36 pressure so the ball 32 in the three-way ball check valve 30 may remain in a position blocking oil from reaching the slave cylinder 38 from the master cylinder 36. As the pressure from the centrifugal electro-hydraulic actuator is decreased, the spring 56 in the clutch 22 may push the slave cylinder 38 away from the clutch 22 which may then set the clutch 22 in ON mode.

In steady state, the valve(s) 52 may be partially open to maintain a constant pressure.

In a number of variations, the driver may manually activate the clutch pedal 34 which may increase the pressure $P_2$ from the master cylinder 36 so that the pressure is greater than the pressure $P_1$ coming from the centrifugal electro-hydraulic actuator 24. This may cause the ball 32 in the three-way ball check valve 30 to change its position so that it blocks any oil coming from the centrifugal electro-hydraulic actuator 24 and may allow oil from the master cylinder 36 into the slave cylinder 38. This may compress the spring 56 in the clutch 22 which may cause the clutch 22 to go into OFF mode.

In a number of variations, the control unit 26 attached to the centrifugal electro-hydraulic actuator 24 may receive and process input from various sensors in light of stored instructions and/or data, and transmit output signals to various actuators. The control unit 26 may include, for example, an electrical circuit, an electronic circuit or chip, and/or a computer. In an illustrative computer variation, the control unit 26 generally may include one or more processors, memory devices that may be coupled to the processor(s), and one or more interfaces coupling the processor(s) to one or more other devices. The processor(s) and other powered system devices may be supplied with electricity by a power supply, for example, one or more batteries 58, fuel cells, or the like. In a number of variations, the control unit 26 used may be dedicated to control the centrifugal electro-hydraulic actuator 24 or the control unit used may already exist in the vehicle and may be used for the centrifugal electro-hydraulic actuator 24 as well as for other purposes.

The processor(s) may execute instructions that provide at least some of the functionality for the disclosed system 20 and methods. As used herein, the term instructions may include, for example, control logic, computer software and/or firmware, programmable instructions, or other suitable instructions. The processor may include, for example, one or more microprocessors, microcontrollers, application specific integrated circuits, programmable logic devices, field programmable gate arrays, and/or any other suitable type of electronic processing device(s).

Also, the memory device may be configured to provide storage for data received by or loaded to the engine system, and/or for processor-executable instructions. The data and/or instructions may be stored, for example, as look-up tables, formulas, algorithms, maps, models, and/or any other suitable format. The memory may include, for example, RAM, ROM, EPROM, and/or any other suitable type of storage article and/or device.

Further, the interfaces may include, for example, analog/digital or digital/analog converters, signal conditioners, amplifiers, filters, other electronic devices or software modules, and/or any other suitable interfaces. The interfaces may conform to, for example, RS-232, parallel, small computer system interface, universal serial bus, CAN, MOST, LIN, FlexRay, and/or any other suitable protocol(s). The interfaces may include circuits, software, firmware, or any other device to assist or enable the control unit 26 in communicating with other devices.

The methods or parts thereof may be implemented in a computer program product including instructions carried on a computer readable medium for use by one or more processors to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one processor or on multiple processors in communication with one another.

The program(s) can be embodied on computer readable media, which can include one or more storage devices, articles of manufacture, or the like. Illustrative computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium also may include computer to computer connections, for example, when data is transferred or provided over a network or another communications connection (either wired, wireless, or a combination thereof). Any combination(s) of the above examples is also included within the scope of the computer-readable media. It is therefore to be understood that the method may be at least partially performed by any electronic articles and/or devices capable of executing instructions corresponding to one or more steps of the disclosed methods.

In any number of variations, the electronic control unit 26 may receive signals from one or more sensors 40 and/or signals, for example as illustrated in FIG. 2, including, but not limited to, pressure and oil temperature sensors, a system enable switch, a gear change switch, and/or any signals from other sources. It may then process this information to determine whether one or more vehicle conditions including, but not limited to, semi-autonomous driving of the manual transmission in traffic congestion and/or situations where the driver is required to brake often while driving, creep, launch, or anti-stall are occurring. If signals are sent to the electronic control unit 26 that a vehicle condition including, but not limited to, semi-autonomous driving of the manual transmission, creep, launch, or anti-stall is occurring, the electronic control unit 26 may process the information and send signals to the centrifugal electro-hydraulic actuator 24 to modulate the pressure toward the check valve 30 which may cause the clutch 22 to go into an ON, OFF, or slipping mode. This may prevent or reduce stalling, improve the launch feel, and/or reduce high energy inputs to the clutch 22 associated with abusive maneuvers.

The electronic control unit 26 may also be configured with a software algorithm which may enhance stop-start, stop-start coasting, and/or enable sailing. In a number of variations, stop-start may be enhanced by "stop in gear" which may allow the driver to leave the gear engaged as opposed to the driver having to move a lever to disengage all the gears (neutral). Sailing may occur when the clutch is disengaged when the vehicle is coasting to reduce braking of the vehicle. Stop-start coasting may be similar to sailing, but the engine may also be stopped while coasting. The engine may then be quickly restarted and the clutch 22 may be engaged when the driver steps back on the gas pedal.

In a number of variations, the centrifugal electro-hydraulic actuator 24 may be operatively connected to a reservoir 28 or may be a self-contained pressure source.

In any number of variations, if the pressure $P_1$ generated from the centrifugal electro-hydraulic actuator 24 is greater than the pressure $P_2$ generated from the clutch pedal 34, then the centrifugal electro-hydraulic actuator 24 may automatically control the clutch 22. If the pressure $P_2$ generated from the clutch pedal 34 is greater than that generated from the centrifugal electro-hydraulic actuator 24, then the clutch 22 may be controlled manually by the clutch pedal 34.

In a number of variations, the hydraulic power pack 24 may be implemented into a dry clutch system or a wet clutch system. In a variation where a wet clutch system may be used, a hydraulic power pack 24 may also provide lubrication and/or cooling oil to the clutch 22.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a method comprising: automatically controlling a manual clutch comprising: operatively connecting a hydraulic power pack actuator to a passive valve which is operatively connected to a clutch; operatively connecting an electronic control unit to the hydraulic power pack actuator; and controlling the hydraulic power pack actuator with the electronic control unit to automatically modulate a pressure to the passive valve to cause the clutch to go into at least one of an ON, OFF, or slipping mode based on at least one vehicle condition.

Variation 2 may include a method as set forth in Variation 1 further comprising: manually controlling the manual clutch comprising: operatively connecting a clutch pedal to the passive valve and manually engaging or disengaging the clutch pedal to increase or decrease the pressure to the passive valve to cause the clutch to go into at least one of the ON, OFF, or slipping mode.

Variation 3 may include a method as set forth in any of Variations 1-2 wherein the hydraulic power pack actuator causes the clutch to go into an OFF mode if a first pressure from the hydraulic power pack actuator is greater than a second pressure from the clutch pedal and wherein the clutch pedal causes the clutch to go into the OFF mode if the second pressure from the clutch pedal is greater than the first pressure from the hydraulic power pack actuator.

Variation 4 may include a method as set forth in any of Variations 1-3 wherein the hydraulic power pack actuator is a centrifugal electro-hydraulic actuator.

Variation 5 may include a method as set forth in any of Variations 1-4 wherein the vehicle conditions include at least one of a creep, a launch, an anti-stall, or a semi-autonomous driving condition.

Variation 6 may include a method as set forth in any of Variations 1-5 wherein the electronic control unit comprises at least one software algorithm which is configured to automatically modulate the pressure to the passive valve to cause the clutch to go into at least one of the ON, OFF, or slipping mode.

Variation 7 may include a method as set forth in any of Variations 1-6 wherein the at least one software algorithm is configured to enhance at least one of a stop-start or a stop-start coasting condition.

Variation 8 may include a method as set forth in any of Variations 1-7 wherein the at least one software algorithm is configured to enable a sailing condition.

Variation 9 may include a method as set forth in any of Variations 1-8 wherein the clutch is a dry clutch.

Variation 10 may include a method as set forth in any of Variations 1-8 wherein the clutch is a wet clutch.

Variation 11 may include a product comprising: a clutch system comprising: a clutch; a first cylinder operatively connected to the clutch; a passive valve operatively connected to the first cylinder; a hydraulic power pack actuator and a second cylinder operatively connected to the passive valve; an electronic control unit operatively connected to the hydraulic power pack actuator; and a clutch pedal operatively connected to the second cylinder.

Variation 12 may include a product as set forth in Variation 11 further comprising a reservoir operatively connected to the second cylinder and the hydraulic power pack actuator.

Variation 13 may include a product as set forth in any of Variations 11-12 wherein the electronic control unit includes at least one software algorithm which controls the hydraulic power pack actuator to modulate the pressure to the passive valve to cause the clutch to go into at least one of the ON, OFF, or slipping mode based on at least one vehicle condition.

Variation 14 may include a product as set forth in Variation 13 wherein the at least one vehicle condition includes at least one of a creep, a launch, an anti-stall, or a semi-autonomous driving condition.

Variation 15 may include a product as set forth in any of Variations 13-14 wherein the at least one software algorithm is configured to enhance at least one of a stop-start or a stop-start coasting condition.

Variation 16 may include a product as set forth in any of Variations 13-15 wherein the at least one software algorithm is configured to enable a sailing condition.

Variation 17 may include a product as set forth in any of Variations 11-16 wherein the hydraulic power pack actuator is a centrifugal electro-hydraulic actuator.

Variation 18 may include a product as set forth in any of Variations 11-17 wherein the clutch is set in the OFF mode by the hydraulic power pack actuator if a first pressure from the hydraulic power pack actuator is greater than a second pressure from the clutch pedal and wherein the clutch is set in the OFF mode by the clutch pedal if the second pressure from the clutch pedal is greater than the first pressure from the hydraulic power pack actuator.

Variation 19 may include a product as set forth in any of Variations 11-18 wherein the clutch is a dry clutch.

Variation 20 may include a product as set forth in any of Variations 11-18 wherein the clutch is a wet clutch.

The above description of select variations within the scope of the invention is merely illustrative in nature and, thus, variations or variants thereof are not to be regarded as a departure from the spirit and scope of the invention.

What is claimed is:

1. A method comprising:
   automatically controlling a manual clutch comprising:
   operatively connecting a hydraulic power pack actuator to a passive valve which is operatively connected to a clutch, wherein the hydraulic power pack actuator is a centrifugal electro-hydraulic actuator;
   operatively connecting an electronic control unit to the hydraulic power pack actuator; and
   controlling the hydraulic power pack actuator with the electronic control unit to automatically modulate a pressure to the passive valve to cause the clutch to go into at least one of an ON, OFF, or slipping mode based on at least one vehicle condition.

2. The method of claim 1 further comprising:
   manually controlling the manual clutch comprising:
   operatively connecting a clutch pedal to the passive valve and manually engaging or disengaging the clutch pedal to increase or decrease pressure to the passive valve to cause the clutch to go into at least one of the ON, OFF, or slipping mode.

3. The method of claim 2 wherein the hydraulic power pack actuator causes the clutch to go into the OFF mode if a first pressure from the hydraulic power pack actuator is greater than a second pressure from the clutch pedal and wherein the clutch pedal causes the clutch to go into the OFF mode if the second pressure from the clutch pedal is greater than the first pressure from the hydraulic power pack actuator.

4. The method of claim 1 wherein the at least one vehicle condition includes at least one of a creep, a launch, an anti-stall, or a semi-autonomous driving condition.

5. The method of claim 1 wherein the electronic control unit comprises at least one software algorithm which is configured to automatically modulate the pressure to the passive valve to cause the clutch to go into at least one of the ON, OFF, or slipping mode.

6. The method of claim 5 wherein the at least one software algorithm is configured to enhance at least one of a stop-start or stop-start coasting condition.

7. The method of claim 5 wherein the at least one software algorithm is configured to enable a sailing condition.

8. The method of claim 1 wherein the clutch is a dry clutch.

9. The method of claim 1 wherein the clutch is a wet clutch.

10. A product comprising:
    a clutch system comprising:
    a clutch;
    a first cylinder operatively connected to the clutch;
    a passive valve operatively connected to the first cylinder;
    a hydraulic power pack actuator and a second cylinder operatively connected to the passive valve, wherein the hydraulic power pack actuator is a centrifugal electro-hydraulic actuator;
    an electronic control unit operatively connected to the hydraulic power pack actuator; and
    a clutch pedal operatively connected to the second cylinder.

11. The product as set forth in claim 10 further comprising a reservoir operatively connected to the second cylinder and the hydraulic power pack actuator.

12. The product of claim 10 wherein the electronic control unit includes at least one software algorithm which controls the hydraulic power pack actuator to modulate the pressure to the passive valve to cause the clutch to go into at least one of the ON, OFF, or slipping mode based on at least one vehicle condition.

13. The product of claim 12 wherein the at least one vehicle condition includes at least one of a creep, a launch, an anti-stall, or a semi-autonomous driving condition.

14. The product of claim 12 wherein the at least one software algorithm is configured to enhance at least one of a stop-start or a stop-start coasting condition.

15. The product of claim 12 wherein the at least one software algorithm is configured to enable a sailing condition.

16. The product of claim 10 wherein the clutch is set to the OFF mode by the hydraulic power pack actuator if a first pressure from the hydraulic power pack actuator is greater than a second pressure from the clutch pedal and wherein the clutch is set to the OFF mode by the clutch pedal if the second pressure from the clutch pedal is greater than the first pressure from the hydraulic power pack.

17. The product of claim 10 wherein the clutch is a dry clutch.

18. The product of claim 10 wherein the clutch is a wet clutch.

* * * * *